(12) United States Patent
El-Batal et al.

(10) Patent No.: US 7,073,022 B2
(45) Date of Patent: Jul. 4, 2006

(54) SERIAL INTERFACE FOR A DATA STORAGE ARRAY

(75) Inventors: Mohamad H. El-Batal, Westminster, CO (US); Yoshihiro Fujie, Fujisawa (JP); Thomas Sing-Klat Liong, San Jose, CA (US); Krishnakumar Rao Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 10/155,315

(22) Filed: May 23, 2002

(65) Prior Publication Data

US 2003/0221061 A1 Nov. 27, 2003

(51) Int. Cl.
*G06F 12/00* (2006.01)
(52) U.S. Cl. ..................................... 711/114
(58) Field of Classification Search ................. 711/114
See application file for complete search history.

(56) References Cited

U.S. PATENT DOCUMENTS

| | | | |
|---|---|---|---|
| 5,202,856 A | 4/1993 | Glider et al. | |
| 5,257,391 A | 10/1993 | DuLac et al. | |
| 5,613,141 A | 3/1997 | Szatkowski et al. | |
| 5,802,366 A | 9/1998 | Row et al. | |
| 5,828,854 A | 10/1998 | Wade | |
| 5,862,313 A | 1/1999 | Johnson et al. | |
| 5,875,458 A | 2/1999 | Nijima et al. | |
| 5,938,744 A | 8/1999 | Roganti et al. | |
| 6,023,754 A | 2/2000 | DuLac et al. | |
| 6,542,954 B1* | 4/2003 | Aruga | 710/316 |
| 6,915,381 B1* | 7/2005 | Fujie et al. | 711/114 |
| 2002/0085493 A1* | 7/2002 | Pekkala et al. | 370/235 |
| 2004/0162926 A1* | 8/2004 | Levy | 710/74 |
| 2005/0027900 A1* | 2/2005 | Pettey | 710/22 |
| 2005/0149650 A1* | 7/2005 | Workman et al. | 710/38 |
| 2005/0223270 A1* | 10/2005 | Lynn | 714/6 |

FOREIGN PATENT DOCUMENTS

| | | |
|---|---|---|
| JP | 2000-10900 | 1/2000 |
| JP | 2001-378580 | * 11/2003 |

OTHER PUBLICATIONS

Microsoft Computer Dictionary, Copyright 1999, Microsoft Press, Fourth Edition, pp. 134, 335-336, and 403.*
Microsoft Computer Dictionary, Copyright 1999, Microsoft Press, Fourth Edition, p. 61.*
"A Quick Look at Serial ATA (SATA) Disk Performance" by Tom Barclay, Wyman Chong, and Jim Gray; Microsoft Research, Oct. 2003.*

(Continued)

*Primary Examiner*—Mano Padmanabhan
*Assistant Examiner*—Midys Rojas
(74) *Attorney, Agent, or Firm*—Chambliss, Bahner & Stophel; David W. Lynch

(57) ABSTRACT

The present invention describes a method and system for interfacing a plurality of device controllers to an array of data storage devices by serial connection. The device controllers are coupled to a serial interface by a bus and the devices of the storage array are coupled to the serial interface by a serial connection. The serial interface receives controller signals through the bus and multiplexes the signals onto the serial connections of the storage array. Arbitration between the various device controllers seeking access to the storage array is resolved through bus protocol and through drive based reserve/release registers in the serial interface processor.

27 Claims, 17 Drawing Sheets

OTHER PUBLICATIONS

"Reliability and Security of RAID Storage Systems and D2D Archives Using SATA Disk Drives" by Gordon F. Hughes and Joseph Murray, ACM Transactions on Storage, vol. 1, No. 1, Dec. 2004, pp. 95-107.*

"Desktop Serial ATA Technology" by Rob Cavin, Kyle Corrigan, and Morgan Lehman; Interl Corporation, Aug. 2nd, 2002.*

"Direct Memory Access Controller for DASD Array Controller," IBM Technical Disclosure Bulletin, vol. 37, No. 12, Dec. 1994, pp. 93-97.

* cited by examiner

SERIAL INTERFACE FOR A DATA STORAGE ARRAY

BACKGROUND OF THE INVENTION

1. Field of the Invention

The present invention relates to a serial interface for a data storage array. More particularly, the present invention relates to interfacing multiple device controllers to an array of data storage devices.

2. Description of Related Art

The need to store and access an increasing amount of information drives the relentless pursuit of larger, faster and more reliable data storage systems. Although various mass storage devices, including optical disks, magnetic tape, and flexible disks, exist today, the hard disk is the most widely used storage device. As technology advances, a number of interface standards have evolved prescribing the way data storage devices are connected to other components in a system. The rate at which data can be transferred to and from the data storage device is a major factor in overall system performance and is controlled in part by the type of interface used. Interface methods for connecting data storage devices and other peripheral devices to a host system include, for example, small computer system interface (SCSI), Universal Serial Bus (USB), Fibre Channel Arbitrated Loop (FC-AL) and advanced technology attachment (ATA). Each of these methods has a characteristic set of protocols and options with corresponding advantages and disadvantages.

Data storage devices with ATA interfaces are used in the vast majority of modern personal computers and offer good performance at low cost. ATA interfaces typically use a parallel sixteen bit data bus and special signaling to prevent commands sent to one device from interfering with commands sent to another device. However, with ever increasing data transfer rates, signaling problems and interference between parallel connections has become a limiting factor for parallel ATA. In August 2001, a new specification was published specifying a serial version of ATA (S-ATA). Serial ATA is a high speed serial interface protocol that minimizes the interference and signaling problems associated with parallel ATA. Serial ATA is compatible with existing ATA software drivers and will run on standard operating systems without modification.

Many applications cannot be adequately accommodated by a single data storage device regardless of its size, performance or quality level. In critical applications, systems cannot go down even for brief periods without causing major problems for the user. Further, some applications require fast data transfer exceeding the transfer rate of current data storage devices. One method used to increase throughput and reliability of data storage systems is arranging data storage devices into a parallel connected array accessible as single data storage device. For example, a number of individual hard disks may be arranged in an array. This type of storage approach is denoted Redundant Array of Independent or Inexpensive Disks (RAID). The fundamental principle behind RAID is the use of multiple hard disks in an array that essentially behaves like a single large, fast disk. There are many different ways to implement a RAID array, generally denoted RAID levels, using some combination of mirroring, duplexing, striping and parity techniques to accommodate various user requirements. The functions of the RAID array are implemented by a RAID controller which may be coupled to a host directly or through a network.

One RAID configuration used to increase system reliability is the active-active controller configuration implemented in conjunction with duplexing. In this configuration, two RAID controllers simultaneously process I/O commands sent from one or more host computers to an array of disks. If one RAID controller in an active-active configuration ceases to operate properly, the surviving RAID controller automatically assumes its workload. Thus, active-active RAID systems provide greater reliability than single controller and active-passive RAID systems in which only one RAID controller actively processes I/O commands at a time.

In addition to increasing reliability, data storage arrays are also used to increase storage system speed. For example, the mechanical components of the hard disk limit data transfer rates because of lag time in physically positioning the read/write head over the magnetic disk for data storage or retrieval. This problem can be reduced through a process denoted striping. Striping is a technique of dividing a large block of data into a number of smaller blocks and storing the smaller blocks on many drives in the array. When the file is retrieved, many disks are used to simultaneously access the file. The use of striping in a RAID array reduces the number of times a read/write head must be positioned to access large data files and correspondingly increases the rate of data transfer.

The use of ATA devices in data storage arrays is attractive because ATA devices are ubiquitous and inexpensive. The serial ATA interface overcomes many of the problems associated with standard parallel ATA and offers a high speed connection that can be used with standard ATA protocols. However, serial ATA is configured as a point-to-point connection from the controller interface to a drive rather than a bus-based system such as SCSI or Fibre Channel. The point-to-point serial interface, such as serial ATA, presents a problem when used to connect an array of many data storage devices to multiple controllers, for example, in the active-active controller configuration. Each data storage device is accessible through only a single serial port, making it impossible to directly connect the device to two controllers simultaneously.

It can be seen there is a need for a method and apparatus to provide a serial interface to be used for data storage arrays with multiple controllers.

SUMMARY OF THE INVENTION

The present invention solves the above-described problem by providing a method and a system for coupling a number of device controllers to a storage array by a serial connection. An embodiment in accordance with the principles of the present invention comprises a method of coupling a plurality of data storage controllers to a data storage array for data transfer, including providing a serial connection to each device in the storage array and transferring data from the plurality of data storage controllers to the devices in the data storage array.

According to one embodiment of the present invention, the serial outputs of a number of device controllers are coupled to multiplexer inputs and the devices of the storage array are coupled to multiplexer outputs by a serial connection. The multiplexer inputs are switched to allow each device controller to access each storage device in the array. Communication between the various device controllers is resolved through controller to controller communication/arbitration I/O processors.

According to another embodiment of the present invention, the device controllers are coupled to one or more interfaces by a bus and the devices of the storage array are coupled to the interfaces by a serial connection. The interfaces receive signals from the device controllers through the bus and direct the signals onto the serial connections of the devices of the storage array. Communication arbitration between the components coupled to the bus is resolved though a bus protocol. Accessibility of the devices of the storage array is determined through drive based reserve/release registers of the interfaces.

According to one aspect of the present invention, one or more interfaces are configured as components of an active midplane.

According to yet another aspect of the present invention, one or more interfaces are configured as field replaceable units and are coupled to the plurality of device controllers through a bus located on a passive midplane.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention describes a method and system for coupling device controllers to devices of a data storage array using one or more interfaces. The method and system described provides for multiple active controllers that may simultaneously process data and request access to the devices of the array. Each device in the array is connected to the system through a point-to-point serial connection. The system arbitrates array access between multiple controllers and multiplexes data onto the serial connections as required.

Figure 1:
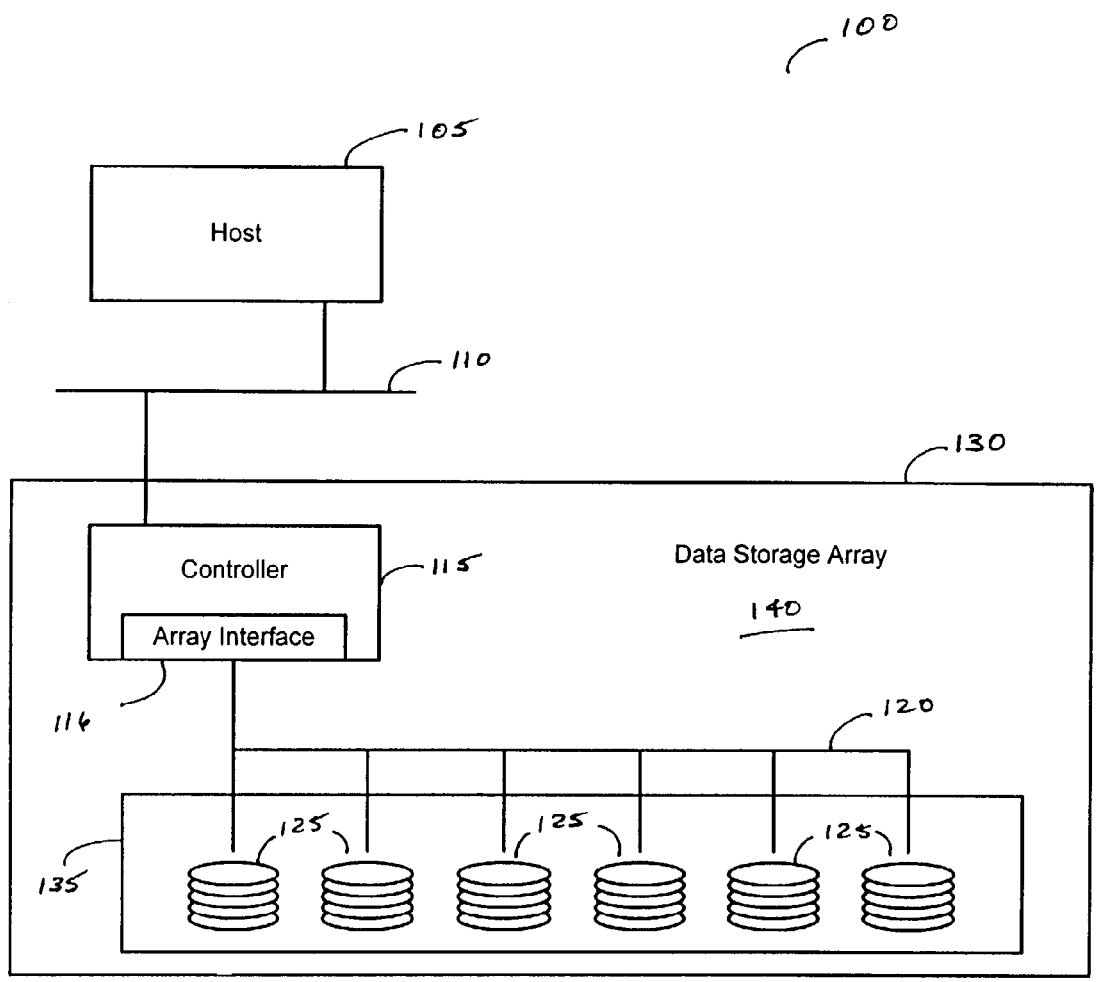
FIG. 1 illustrates a block diagram of a computer system using a data storage system.

FIG. 1 illustrates a block diagram of a system 100 using a data storage system 140. The data storage system 140 is illustrated as a system enclosed in a chassis 130 containing multiple data storage devices 125 and one or more controllers 115. In the example given in FIG. 1, only one controller 115 is shown, however, more than one controller may be located in the enclosure 130. In addition, the enclosure 130 houses the various power supplies, cooling equipment, user interface circuitry and other devices (not shown) required for operation. The host system 105 is connected to the controller 115 located in the storage system 140. The host system may be directly connected to the controller, or may be connected through a system bus 110. For example, a bus configuration such as Fibre Channel, InfiniBand or SCSI may be used for connecting the host system 105 to the storage system 140. In addition, multiple host systems and other peripherals may be networked onto the bus in various configurations.

The controller 115 includes circuitry for controlling the flow of data to and from the data storage array 135. The controller 115 receives commands from the host system 105, processes the commands and relays them to the data storage array 135. For example, the controller 115 may receive commands to store or retrieve data from the data storage array 135. The controller 115 then converts these commands to the protocol required by the array devices 125. The controller 115 may also include specialized circuitry for performing striping calculations, such as those required in a RAID system, accommodating direct memory access (DMA) operations, and performing data error checking algorithms, for example.

The controller 115 is coupled to the data storage array 135 through an array interface 116. The array interface 116 may be configured for any of a variety of device interface protocols as previously discussed, including ATA and SCSI. In the example of FIG. 1, the data storage array 135 is connected to the array interface 116 in a bus configuration 120. One skilled in the art, however, will recognize that the array of devices may also be connected to the array interface by other methods including daisy chain configuration or point-to-point configuration.

Figure 2:
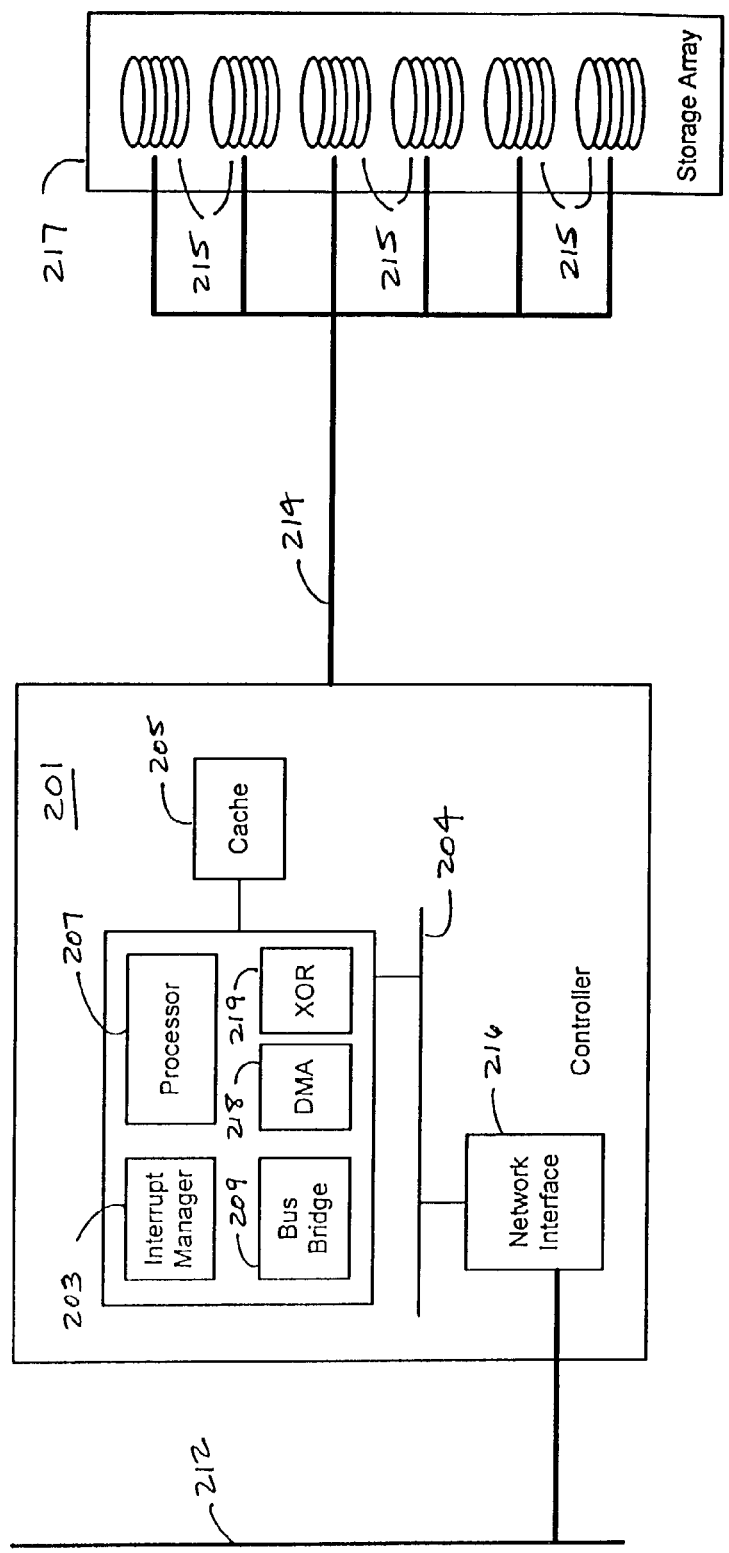
FIG. 2 illustrates a block diagram of a data controller.

One example of a data storage controller is illustrated in more detail in the block diagram of FIG. 2. The controller 201 is coupled to the system network though a system bus 212. The type of bus connection may be any of the known network bus methods such as Fibre Channel, IB, SCSI, for example. The network connection requires a network interface 216 which allows the storage system to communicate with the "outside world" including the host system and other peripheral devices. The controller 201 may also include one or more local buses requiring bus control circuitry such as a bus bridge 209. The local bus allows various controller components including, for example, the network interface 216, to be coupled to the controller processor 207.

The controller processor 207 typically controls the data transfer functions of the controller 201. The controller processor may perform, for example, striping calculations for dividing large blocks of data into small blocks for distribution among the many devices in the array 215. The processor 207 may accept, process and transfer commands and data between the network host (not shown) and the data storage array 217.

The controller may optionally include various types of memory. In the example of FIG. 2, the controller 201 is shown to include cache memory 205. The cache 205 is specialized memory for data storage used to speed up transfers of frequently accessed data in accordance with various techniques known in the art.

The controller 201 may optionally include specialized circuitry for performing direct memory access (DMA) transfers, error checking (XOR) and interrupt management. The DMA circuitry 218 is capable of moving large blocks of data without requiring processor intervention. This type of specialized circuitry speeds up data storage or retrieval when it is necessary to transfer large blocks of contiguous data. The controller 201 may also include specialized circuitry for performing error checking, for example, circuitry to calculate the exclusive OR function for generating parity. Specialized error checking circuitry 219 reduces the amount of processor cycle time expended performing software error checking algorithms, thereby freeing the processor for other functions related to data transfer. In addition, the controller may include specialized circuitry for managing processor interrupts, such as an interrupt manager 203.

The controller 201 is coupled to each device 215 in the data storage array 217 using a compatible interface protocol, for example, SCSI or ATA. In the example shown in FIG. 2, the controller 201 is connected to the array devices by a peripheral bus 214. Each array device 215 includes circuitry to accept commands from the controller and circuitry necessary for operation of the device. For example, a hard disk would include drive and sense circuitry (not shown) for controlling the disk spindle motor (not shown), and reading and storing bits of data on the magnetic disk (not shown).

In some circumstances it is beneficial for two controllers to be connected to the data storage array simultaneously. The configuration illustrated in FIG. 3A, for example, can be used in conjunction with a duplexing technique wherein two RAID controllers 310, 320 simultaneously process I/O commands sent from a host computer 305 to the data storage array 340. Typically, the controllers 310, 320 are arranged so that if one controller ceases to operate properly, the surviving controller automatically assumes its workload. This technique is denoted failover and requires both controllers to be active at the same time.

Figure 3A:
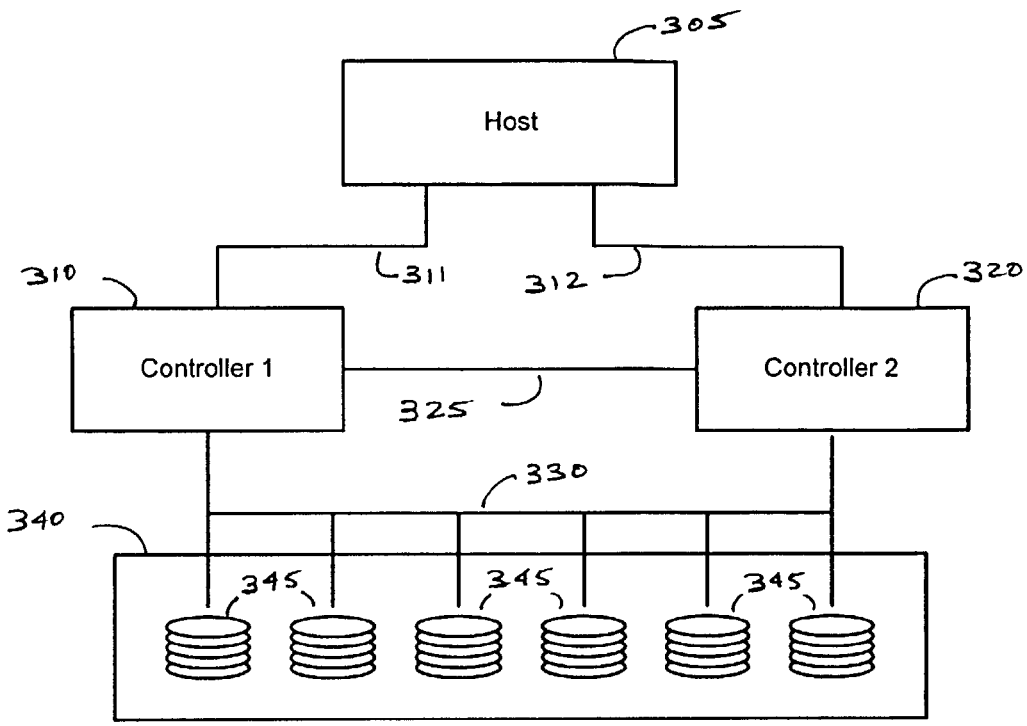
FIG. 3A illustrates a diagram of an active-active data storage system coupled to a host.
Figure 3B:
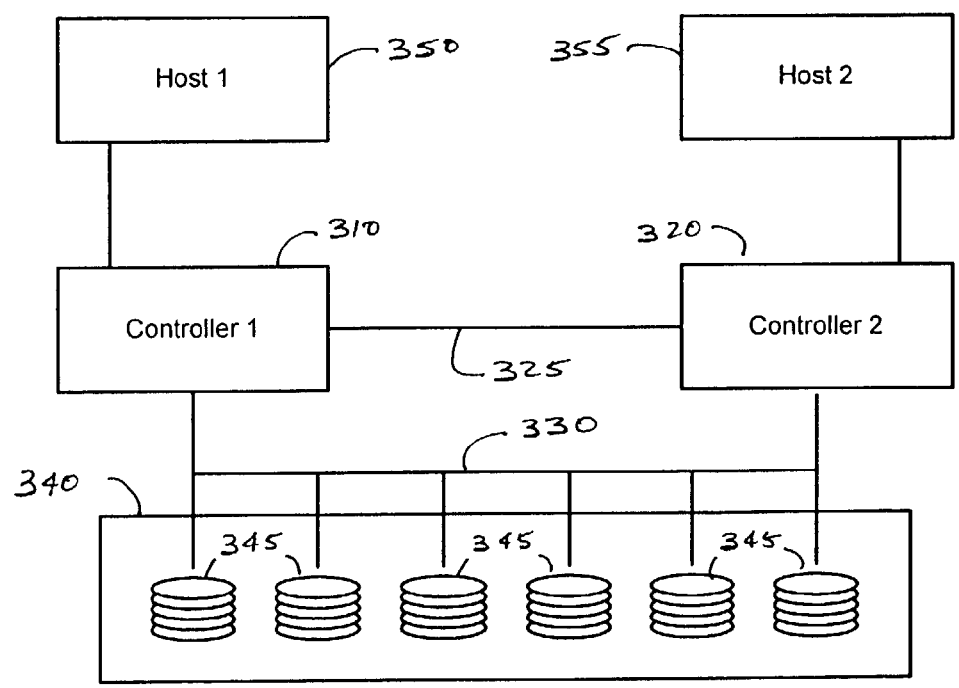
FIG. 3B illustrates a diagram of an active-active data storage system wherein each controller is coupled to a separate host.

As depicted in the example of FIG. 3A, the host system 305 is connected to controller 1 310 and controller 2 320 through connections 311 and 321, respectively. The controllers 310, 320 may also be coupled through a connection 325 independently of the host system 305 for coordination purposes. Both controllers 310, 320 are shown coupled to the data storage array 340 through a peripheral bus 330. In the event that controller 1 310, for example, ceases to operate, controller 2 320 can assume the workload. Alternatively, as depicted in FIG. 3B, each active controller 310, 320 may be coupled to a separate host system 350, 355.

A majority of hard disks use the standard ATA interface and the availability and low cost of ATA hard disks makes them advantageous for use in data storage arrays. However, as previously discussed, the advantage of low cost and availability of parallel ATA is offset by lower speed due to interference between the parallel connections at higher transfer rates. Serial ATA uses a high speed serial connection which minimizes the interference and signaling problems associated with parallel ATA but is compatible with existing ATA drivers. Serial ATA is one example of a serial interface that may be used in data storage arrays.

Figure 4A:
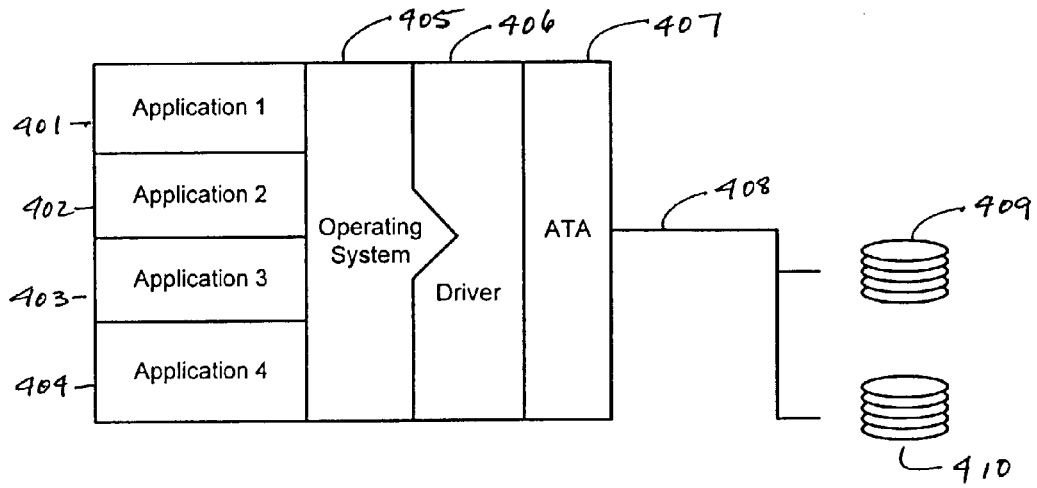
FIG. 4A illustrates protocol layers of a standard ATA interface.

FIG. 4A illustrates the interaction of system applications with standard ATA protocol from a software perspective. Applications 1–3 401, 402, 403 depict various user software applications which operate on computer system and may require access to data storage. The software applications 401, 402, 403 run within the framework of the host operating system 405 that accesses the device driver software 406. The device driver 406 consists of a set of routines for controlling a peripheral device attached to the host system. If the peripheral device is an ATA device the driver provides a protocol consistent with the ATA interface protocol 407. In FIG. 4A, two standard ATA devices are depicted connected to the host system through the standard parallel ATA connection 408.

Figure 4B:
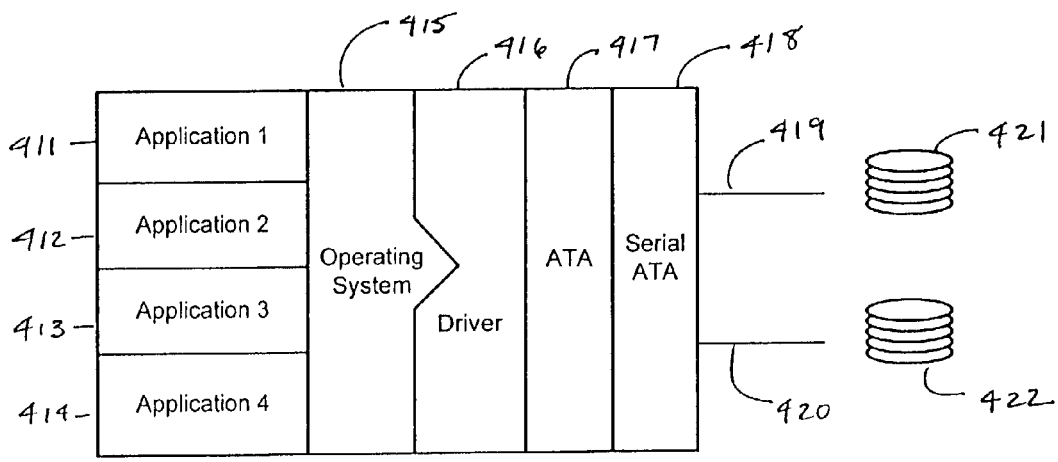
FIG. 4B illustrates protocol layers of a serial ATA interface.

Turning now to FIG. 4B, the software perspective of the interaction of system applications with data storage devices requiring a serial ATA protocol is illustrated. As in the previous example of FIG. 4A, applications 1–3 411, 412, 413 run within the framework of an operating system 415. The operating system 415 accesses the device driver routines 416 that provide a protocol consistent with the standard ATA protocol 417. Serial ATA requires the additional step of converting the standard ATA protocol 417 into the serial ATA protocol 418 compatible with the serial ATA disk drives 421, 422. The serial ATA disks 421, 422 are coupled to the host system in a point-to-point configuration through serial connections 419, 420.

Figure 5:
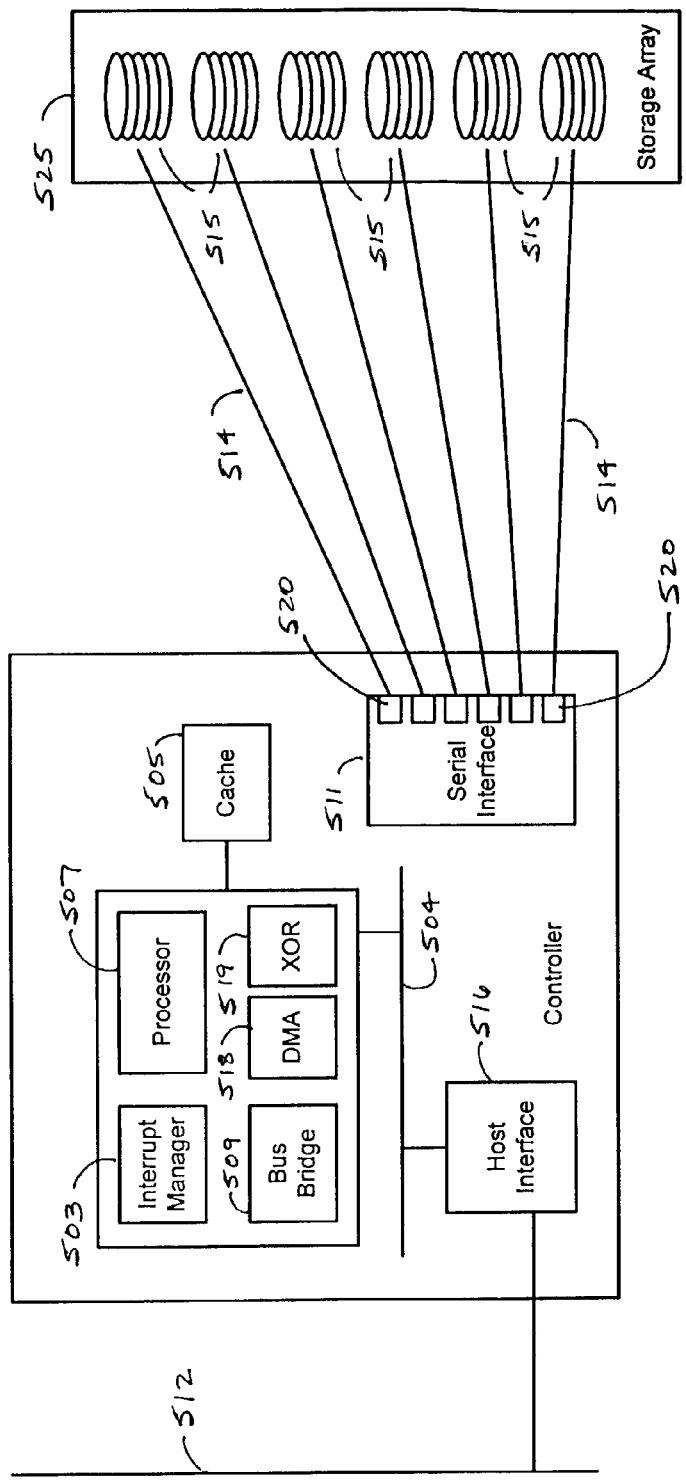
FIG. 5 illustrates a controller with a serial interface.

FIG. 5 shows a block diagram of a data storage system comprising an array of serial devices. Functionally, the controller 501 for this storage system is similar to the generalized controller depicted in FIG. 2. However, in this example, the controller 501 is shown with a serial interface 511 connected to each device 515 in the array 525 in point-to-point fashion. The serial interface 511 includes physical layer interfaces 520 for each device 514 in the array 513. A physical layer interface 520 provides the physical layer connection compatible with the serial devices as described more fully hereinbelow.

A data storage device interface supports various methods for transfer of information into and out of storage, for example, programmed I/O and DMA transfer. The operation of the physical layer interface will be described in the context of a programmed I/O transfer. Data flows from the host system to the controller via the system bus 512 and through the host interface 516 at the controller 501. In the case of programmed I/O (PIO) data storage, the controller 501 receives commands and data to be stored from the host. The controller processor 507 generates signals appropriate to implement the host commands, and may process the data to be stored, for example, to support a desired RAID configuration. The data is transferred to the array devices through individual physical layer interfaces 520 connected to each device 515 through serial connections 514.

Figure 6:
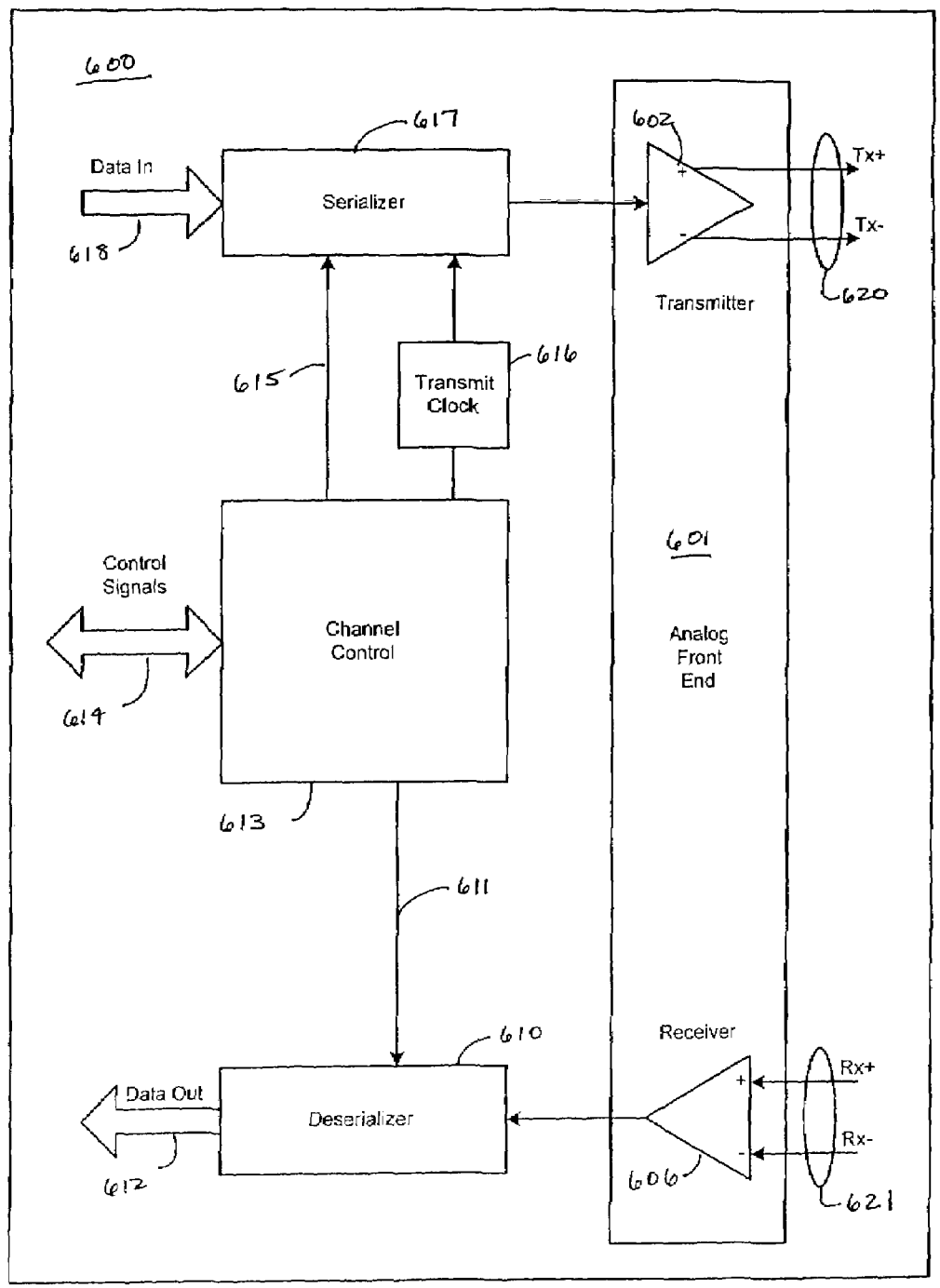
FIG. 6 illustrates a physical layer interface for implementing serial ATA.

Turning now to FIG. 6, a more detailed illustration of a physical layer interface is provided. Control signals 614 generated by the processor (not shown) to control the data flow are processed by the channel control unit 613 of the physical layer interface 600. Data to be stored is input though data lines 618 to a serializer 617 which converts the data to a serial data stream in synchrony with a transmit clock 616. The serial data stream is transmitted through the transmitter driver 602 over a single twisted pair connection 620 and to the data storage device (not shown). In the case of PIO data retrieval, a data storage device (not shown) transmits a serial data stream over a single twisted pair connection 621 in response to a command from the host to retrieve data. The serial data flows through the receiver 606 located in the physical layer interface 600. The serial data stream is deserialized in the deserializer circuitry 610 and transmitted via data lines 612 to the controller processor (not shown) and finally to the host system (not shown).

When two controllers are arranged in an active-active configuration, as previously discussed in connection with FIG. 3, serial protocol may require a point-to-point connection between each device in the array and each controller. Because each serial device is accessible by only a single serial port, a direct connection between the device and two controllers is impossible. Accessing devices used with dual active controllers requires an interface system capable of switching the connection between each device and one or more controllers in the system.

Figure 7A:
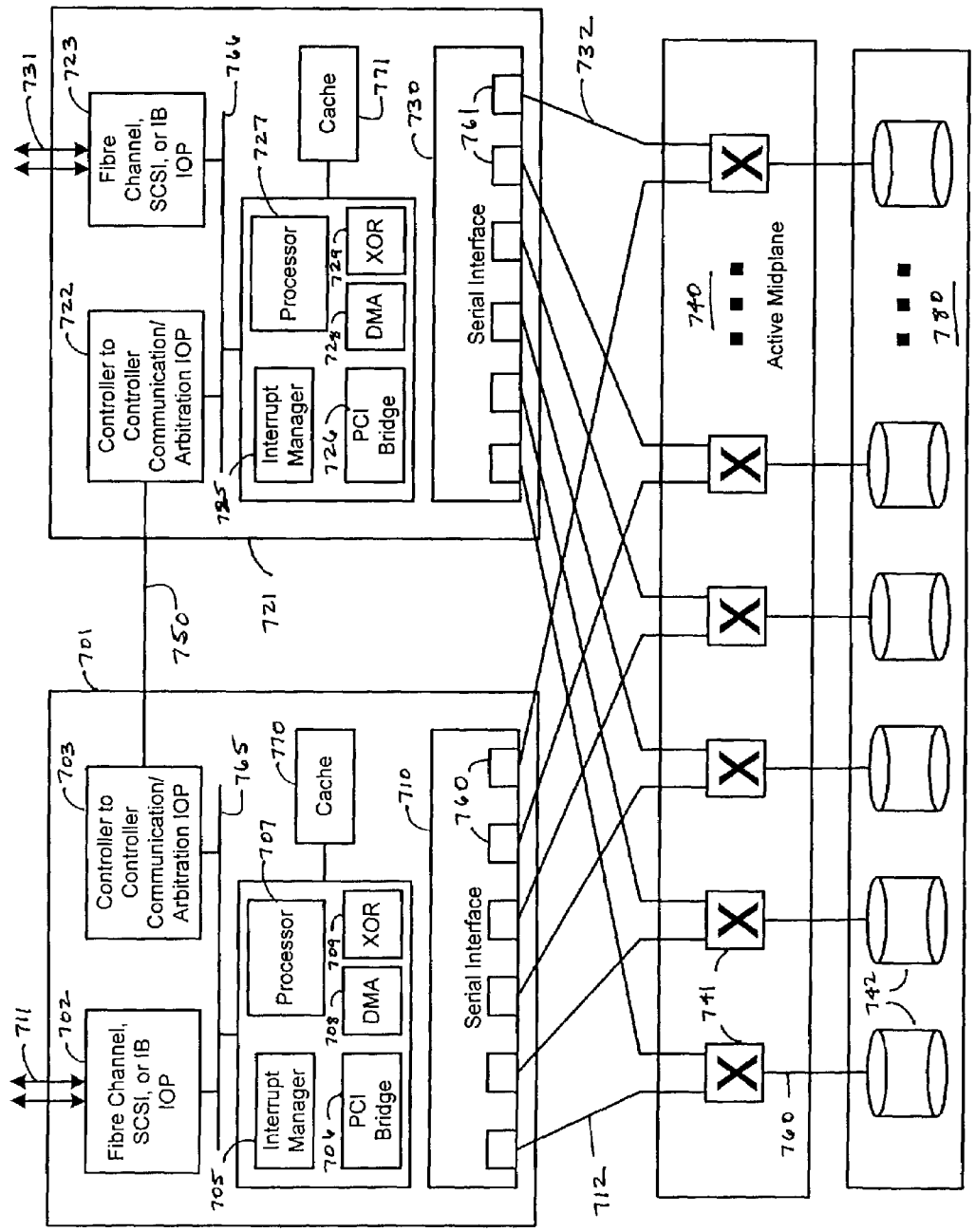
FIG. 7A illustrates a data storage system using two controllers and a plurality of multiplexers located on the system midplane in accordance with one embodiment of the present invention.

FIG. 7A illustrates an interface system capable of accessing a data storage array by dual active controllers in accordance with one embodiment of the present invention. In FIG. 7A, the functional blocks of each controller 701, 721 are essentially as previously discussed in connection with FIG. 5, including the host interface 702, 722, processor 707, 727, bus bridge 706, 726, interrupt manager 705, 725, DMA circuitry 708, 728, XOR circuitry 709, 729, cache memory 770, 771 and serial interface 710, 730. In addition, each controller has a controller to controller communication and arbitration I/O processor 703, 723 coupled through a dedicated connection 750.

The outputs of the physical layer interfaces 760, 761 of each controller 701, 721 are connected to the inputs of 2:1 multiplexers 741. A multiplexer is associated with each disk 742 in the array 780. The multiplexers 741 are located on an active midplane 740 and control the connections between the multiple controllers and the devices of the array The midplane 740 is designated "active" because it includes active circuitry in addition to various connectors for coupling the components of the data storage system. In one configuration, for example, the active midplane 740 is a printed circuit board attached to the data storage system chassis with connectors and circuitry located on both sides of the printed circuit board. The multiplexers 741 make connections between physical layer interface connections 712 of one controller 701 and physical layer interface connections 732 of the other controller 721 as the controllers 701, 721 simultaneously process data and require access to the disks 742 of the data storage array 780 for data storage or retrieval.

Figure 7B:
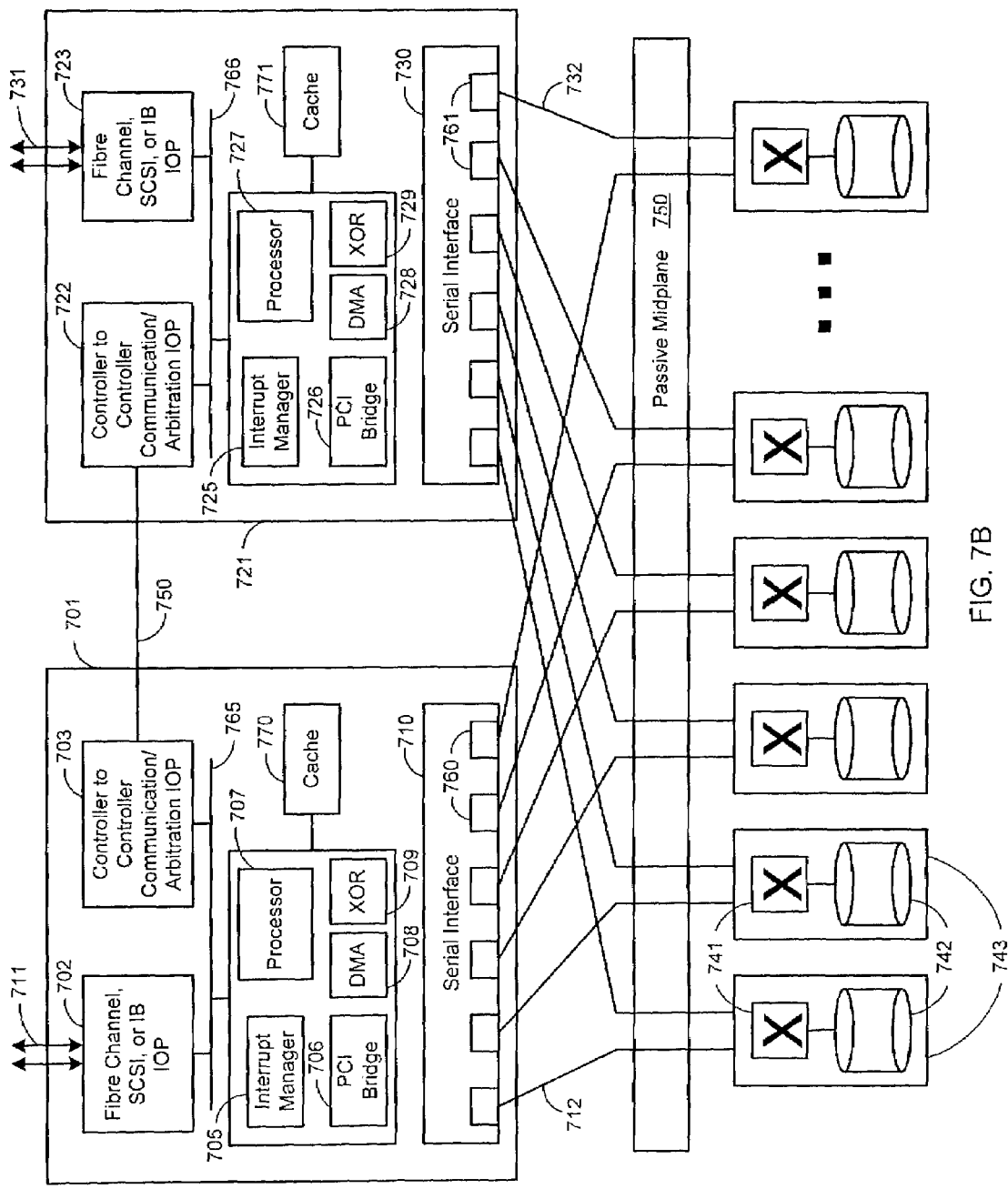
FIG. 7B illustrates a data storage system using two controllers and multiplexers configured in field replaceable data storage device carriers.

FIG. 7B illustrates another embodiment of the invention including two controllers 701, 721. The functional blocks of each controller are arranged as previously discussed above in connection with FIG. 7A. In this embodiment, the controllers 701, 721 are coupled to a passive midplane 750. A multiplexer 741 coupled to each data storage device 742 is included in a data storage device carrier 741. The data storage device carriers 743 are designed to connect to the midplane 750 and are field replaceable units. Each data storage carrier 743 houses a single data storage device 742 and a data storage device multiplexer 741. The data storage device carriers 743 are coupled to the controllers 701, 721 through the passive midplane 750. The data storage device carriers 743 are field replaceable units, allowing the multiplexer and the data storage device to be easily replaced in the event of failure.

Figure 8:
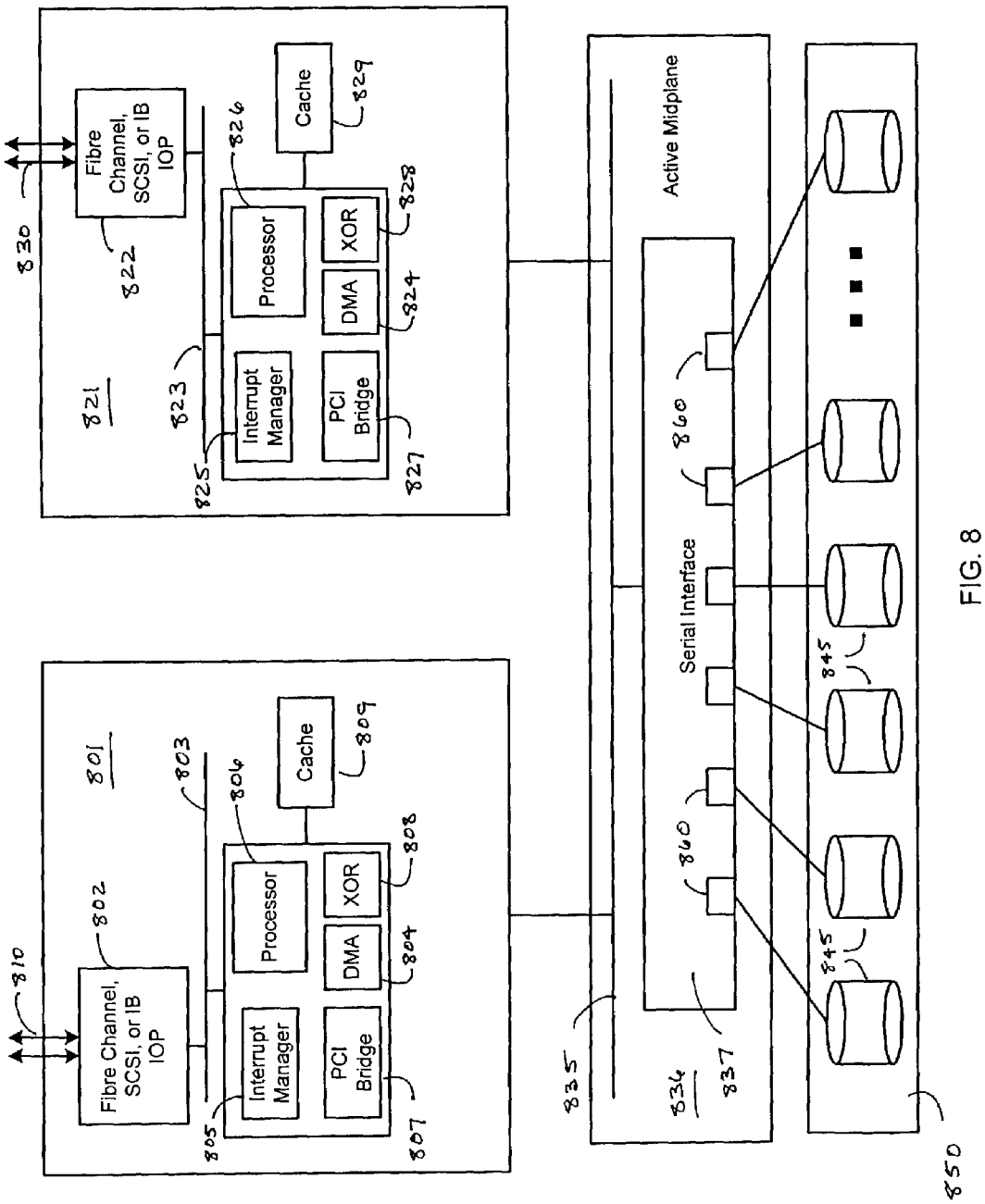
FIG. 8 illustrates a data storage system using a bus-based serial interface located on the system midplane in accordance with one embodiment of the present invention.

Another embodiment of the present invention, illustrated in FIG. 8, moves the communication, arbitration and multiplexing functions to a bus based serial interface 837 located on an active midplane 836. In accordance with this embodiment, two controllers 801, 821 are arranged in an active-active configuration. The functional blocks of each controller are essentially as previously discussed in connection with FIG. 5, including the host interface 802, 822, processor 806, 826, bus bridge 807, 827, interrupt manager 805, 825, DMA circuitry 804, 824, XOR circuitry 808, 828, and cache memory 809, 829. However, the serial interfaces for each controller 801, 821 are combined and moved to an active midplane 836. The combined serial interface 837 is connected to the controllers 801, 821 through a bus 835. For example, the combined serial interface 837 may be connected to the controllers 801, 821 through a PCI or PCIX bus. Each device 845 in the array 850 is coupled by serial connection 840 to the serial interface 837 through the physical layer interface 860 associated with the device.

Figure 9:
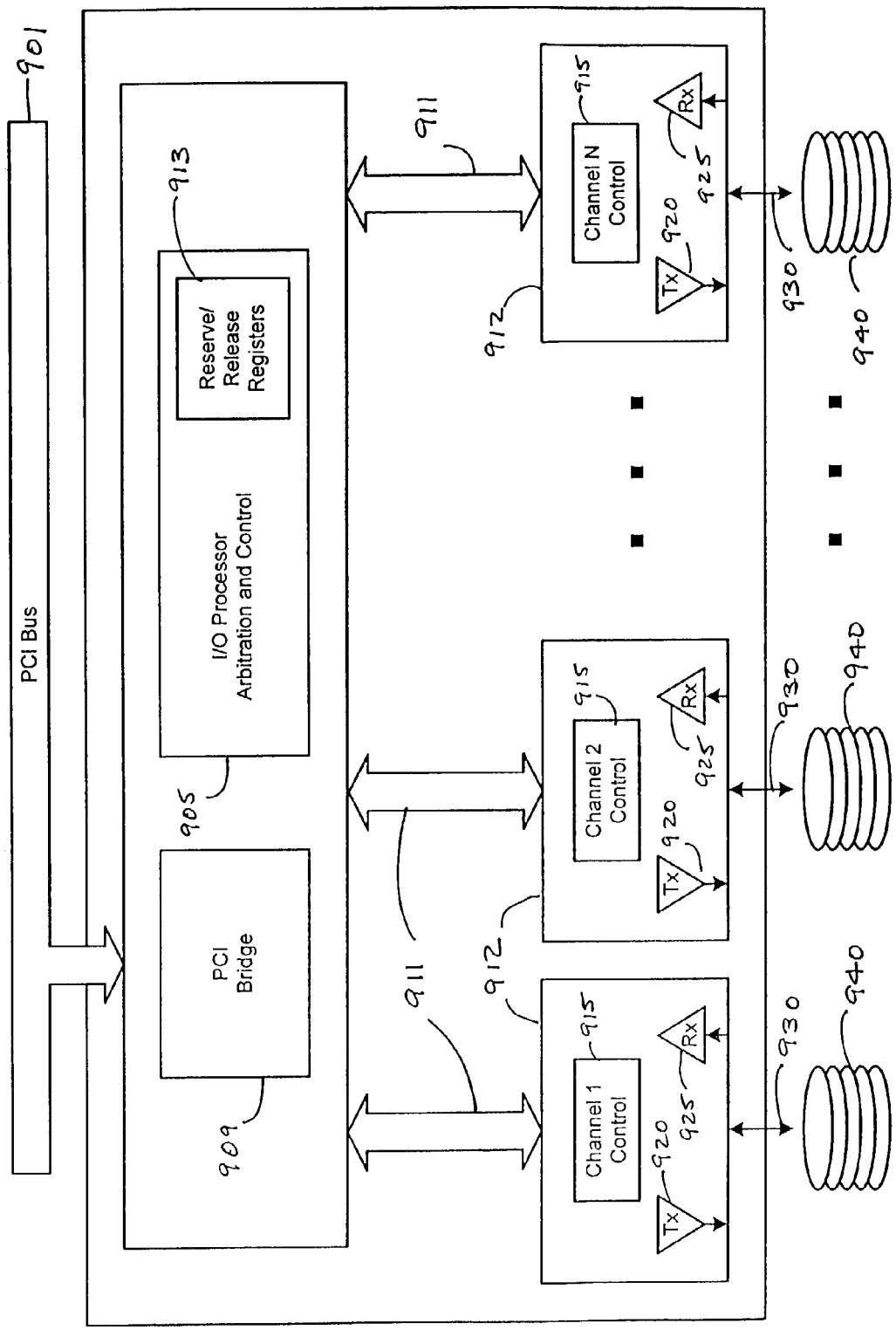
FIG. 9 illustrates a more detailed block diagram of the serial interface in accordance with one embodiment of the present invention.

FIG. 9 illustrates a more detailed block diagram of the combined serial interface. In accordance with this example of the invention, a serial interface 902 is coupled to controllers (not shown) through a bus 901, such as a PCI bus, through bus bridge circuitry 909. The functions of multiplexing, arbitration and communication between multiple controllers is accomplished through the bus protocol and by reserve/release registers of the serial interface I/O processor 905. The bus bridge circuitry 909 allows the bus 901 to support device bus mastering, and provide bus arbitration facilities. The design of the bus allows bus mastering of multiple devices on the bus simultaneously, with the arbitration circuitry working to ensure that no device on the bus locks out any other device. Further, the bus allows any given device to use the full bus throughput if no other device requires data transfer. In this manner, multiple controllers can access the bus, sharing a communication channel that is managed by the bus circuitry. For example, data may be passed between two controllers or between a controller and the data storage array over the bus using bus protocol for control and arbitration for the data transfer.

In addition to the arbitration functions provided by the bus 901 and associated circuitry 909, the serial interface processor 905 contains special drive based reserve/release registers 913 indicating the status of each data storage device 940. In one embodiment, the reserve/release registers indicate when a connection 930 is available for data transfer between a controller (not shown) and a data storage device. When a controller gains access to the array, control and data signals 911 are transferred through the serial interface to the physical layer interfaces 912 and on to the data storage devices 940 through serial connections as previously discussed.

Figure 10A:
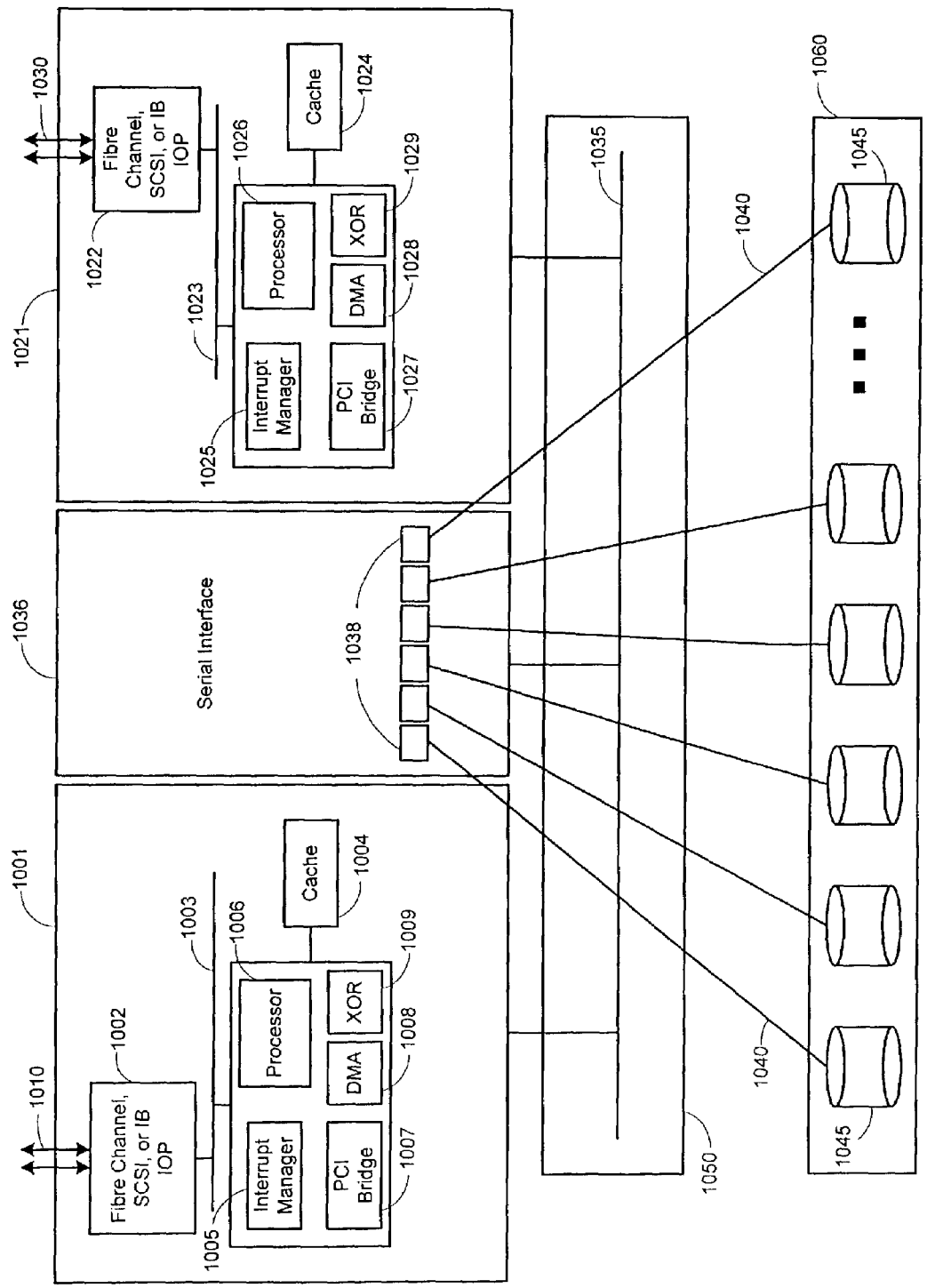
FIG. 10A illustrates a data storage system using a bus-based serial interface configured as a field replaceable unit in accordance with an embodiment of the present invention.

Turning now to FIG. 10A, another embodiment of the present invention is illustrated. In this embodiment, the serial interface 1037, including multiple physical layer interfaces 1038, is arranged as a field replaceable unit on a removable circuit board 1036. In this example, the serial interface 1037, along with dual active controllers 1001, 1021 are connected through a PCI bus 1035 through a passive midplane 1050. The midplane, for example, may include only connectors for coupling the various components to the bus. The serial interface 1037 and each of the controllers 1001, 1021 may each be located on separate printed circuit boards physically coupled to the passive midplane 1050 through connectors, for example. This arrangement is advantageous when the increased serviceability of a field replaceable unit is desired. The method of operation of this configuration is essentially identical to that discussed in connection with FIGS. 8 and 9.

Figure 10B:
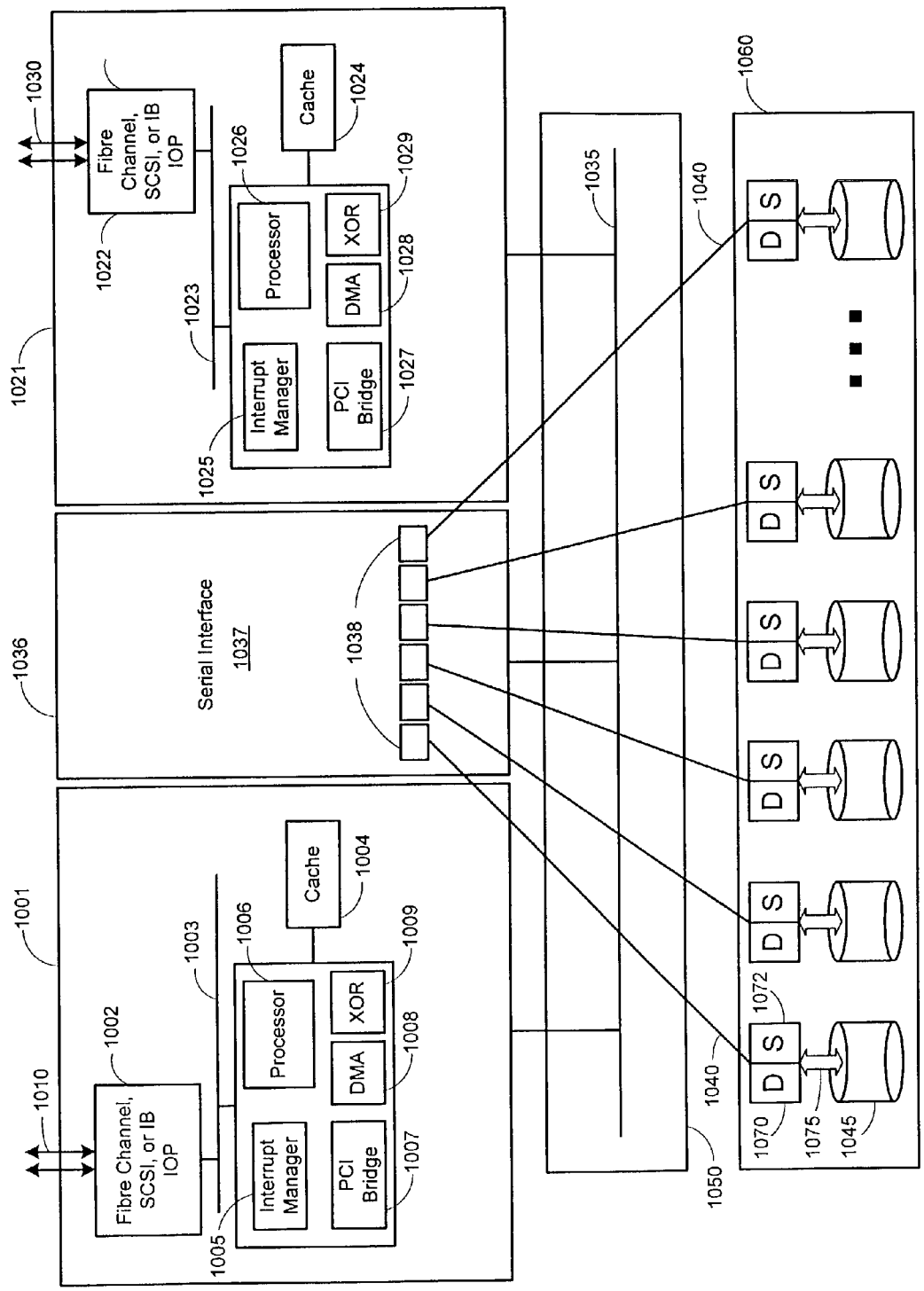
FIG. 10B illustrates a data storage system using a field replaceable serial interface and serializer/deserializer circuitry coupled to parallel I/O data storage devices.

The present invention may also be configured for use with parallel I/O data storage devices, if desired, as illustrated in FIG. 10B. In this embodiment, the serial interface 1037, including multiple physical layer interfaces 1038, is arranged as a field replaceable unit on a removable circuit board 1036. The serial interface 1037, along with dual active controllers 1001, 1021 are connected through a PCI bus 1035 through a passive midplane 1050. The midplane may include only connectors for coupling the various components to the bus. The serial interface 1037 and each of the controllers 1001, 1021 may each be located on separate printed circuit boards physically coupled to the passive midplane 1050 through connectors, for example.

The serial interface 1037 is coupled to a data storage array 1060 including a number of parallel I/O data storage devices 1045. Serial connections 1040 from the serial interface 1037 are coupled to serializer/deserializer circuitry 1072, 1070. The serializer/deserializer circuitry 1072, 1070 is coupled to the parallel I/O data storage devices 1045 through parallel connections 1075. For data storage operations, the serializer/deserializer circuitry 1072, 1070 converts the serial data stream produced by the serial interface 1037 to a parallel I/O format compatible with the parallel I/O data storage devices 1045. For data retrieval operations, the serializer/deserializer circuitry, 1072, 1070 converts the parallel data from the data storage devices 1045 into a serial format compatible with the serial interface 1038. The serializer/deserializer circuitry 1072, 1070 coupled with parallel I/O storage devices 1045 may also be substituted in place of the serial data storage devices 742 in the data storage systems using multiplexers as illustrated in FIGS. 7A and 7B, or in place of the serial data storage devices 1145 in the data storage system that uses two bus-based serial interfaces configured as field replaceable units, as illustrated in FIG. 11.

Figure 11:
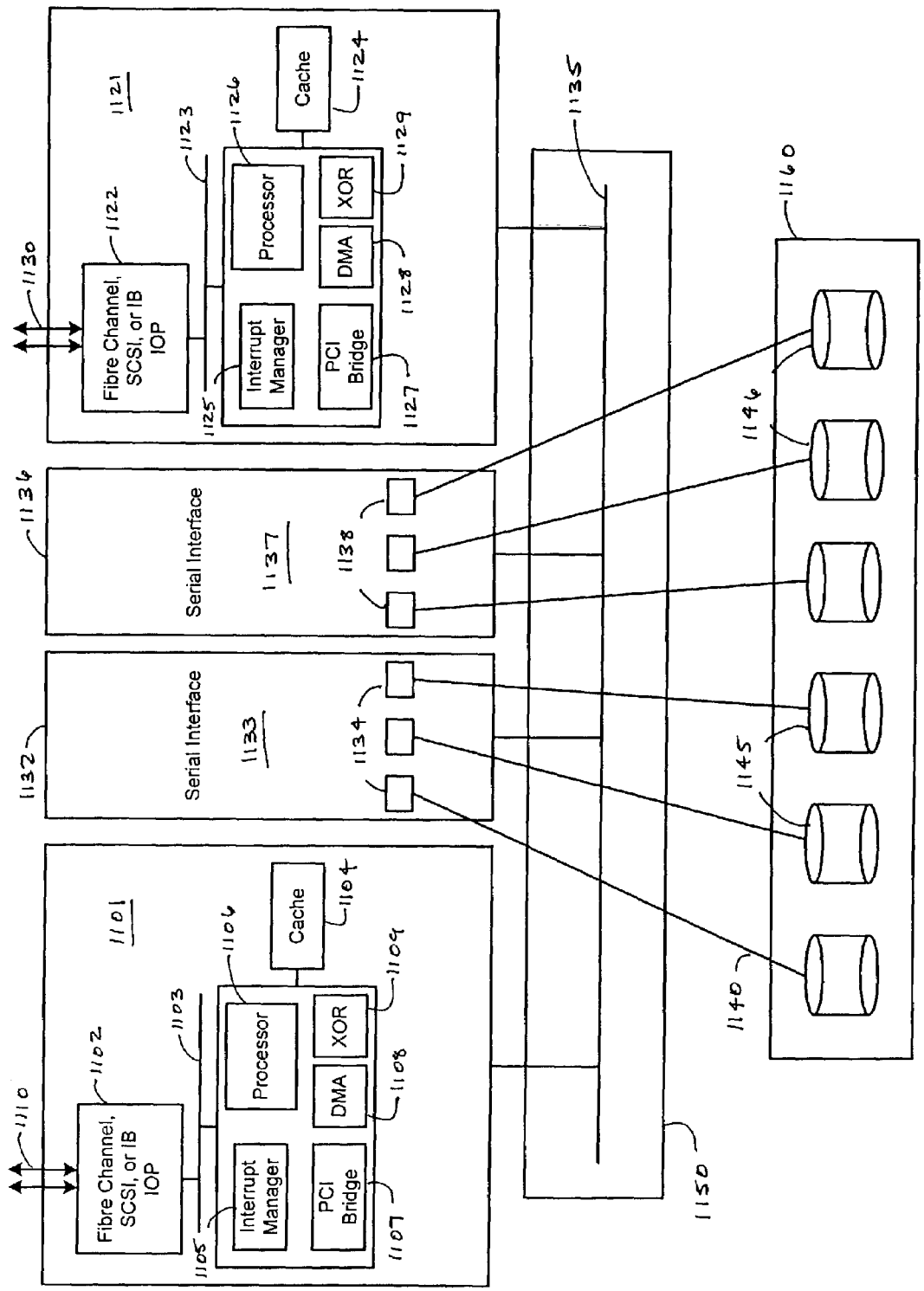
FIG. 11 illustrates a data storage system using two bus-based interfaces configured as field replaceable units.

In an alternative embodiment, shown in FIG. 11, separate serial interfaces can be used to access a portion of the storage devices in the array. In this configuration, one serial interface 1133 couples to a portion of the data storage devices 1145 in the array 1160 through serial connections 1140. Another serial interface 1137 couples to the remainder of the data storage devices 1146 in the array 1160 through serial connections 1141. The controllers 1101, 1121 can access each other or either serial interface 1133, 1137, through a bus 1135. This configuration is particularly useful for data redundancy wherein data is mirrored on two sets of disks in the array, such as in RAID system implementing RAID level 1. The serial interfaces may optionally be arranged on printed circuit boards 1132, 1136 and coupled to the bus 1135 though connectors (not shown) to facilitate replacement in the field.

Figure 12:
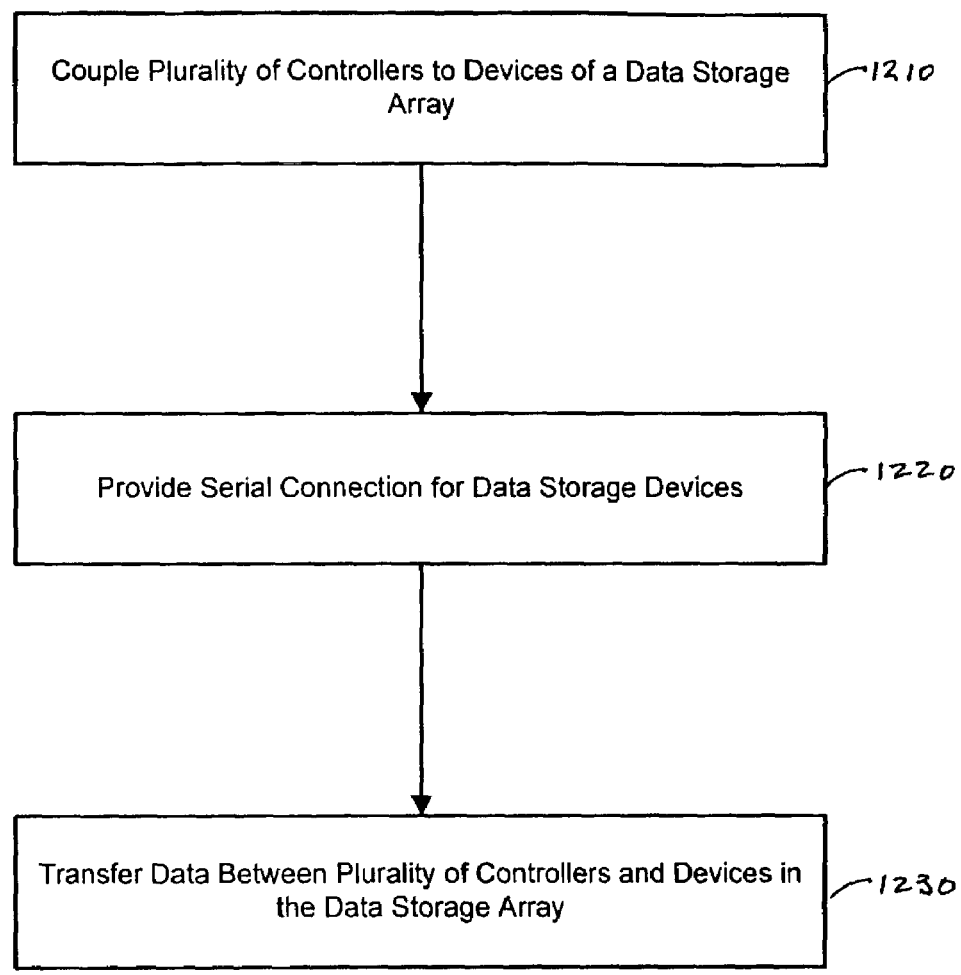
FIG. 12 is a flowchart illustrating the process of data storage in accordance with one embodiment of the present invention.

Turning now to FIG. 12, a method of coupling a plurality of device controllers to devices in a data storage array for data transfer is shown in accordance with an embodiment of the invention. A plurality of controllers is coupled to the devices in a storage array 1210. A serial connection is provided for each of the array devices 1220. Data is transferred between the plurality of controllers and the devices in the storage array 1230. In this embodiment, the controllers may be arranged in an active-active configuration, wherein transfer of data between the plurality of controllers and the devices of the data storage array requires various arbitration and communication functions necessary to control multiple active controllers seeking access to a single data storage device.

Figure 13:
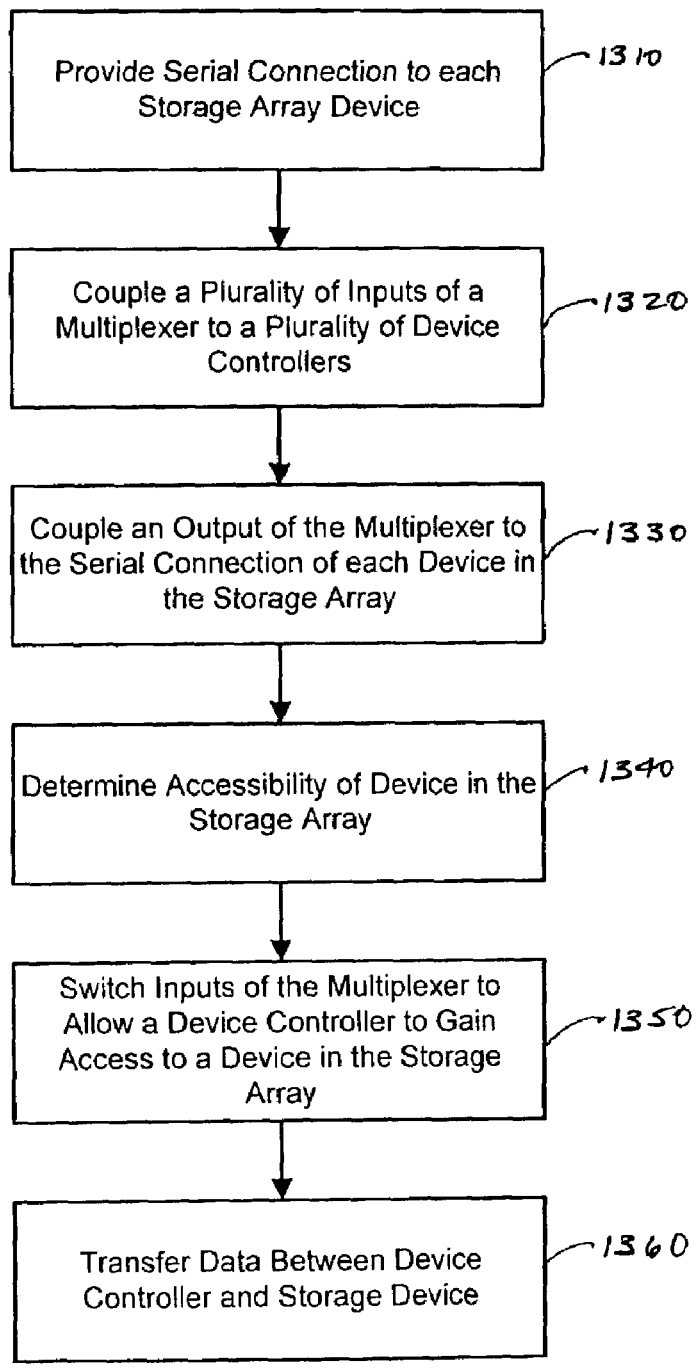
FIG. 13 is a flowchart illustrating the process of data storage in accordance with a multiplexer-based system in accordance with an embodiment of the present invention.

FIG. 13 is a flowchart describing a method of coupling a plurality of device controllers to a storage array in accordance with another embodiment of the invention. A serial connection is provided to each device in a storage array 1310. A plurality of multiplexer inputs are coupled to a plurality of device controller outputs 1320. An output of the multiplexer is coupled to each device in a data storage array 1330. Accessibility of the device in the storage array is determined 1340. The inputs of the multiplexer switch to allow a device controller to gain access to a device in the array 1350 and data is transferred between the device controller and the device 1360.

Figure 14:
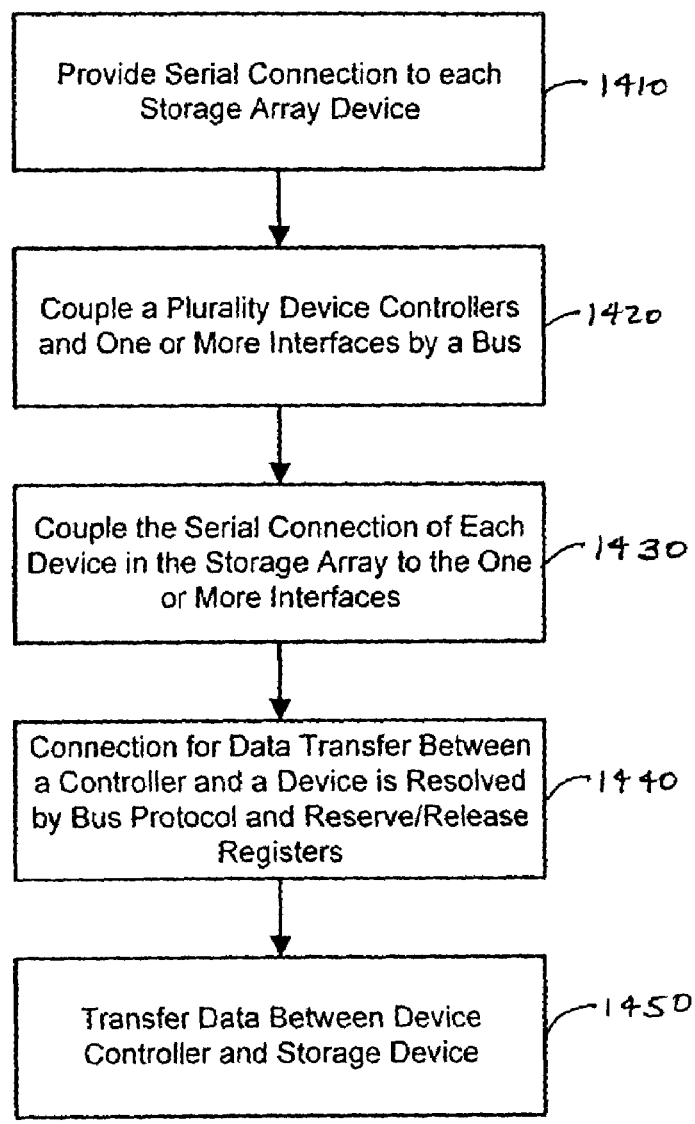
FIG. 14 is a flowchart illustrating the process of data storage in accordance with a bus-based system in accordance with an embodiment of the present invention.

FIG. 14 is a flowchart describing a method of coupling a plurality of device controllers to a storage array in accordance with another embodiment of the invention. A serial connection is provided to each device in a storage array 1410. A plurality of device controllers and one or more interfaces are coupled together via a bus 1420. The devices in the storage array are coupled to the interfaces through serial connections 1430. Connection for data transfer between a controller and a device in the data storage array is arbitrated through bus protocol and reserve/release registers of the serial I/0 processor 1440. Data is transferred between a device controller and the device in the storage array 1450.

Figure 15:
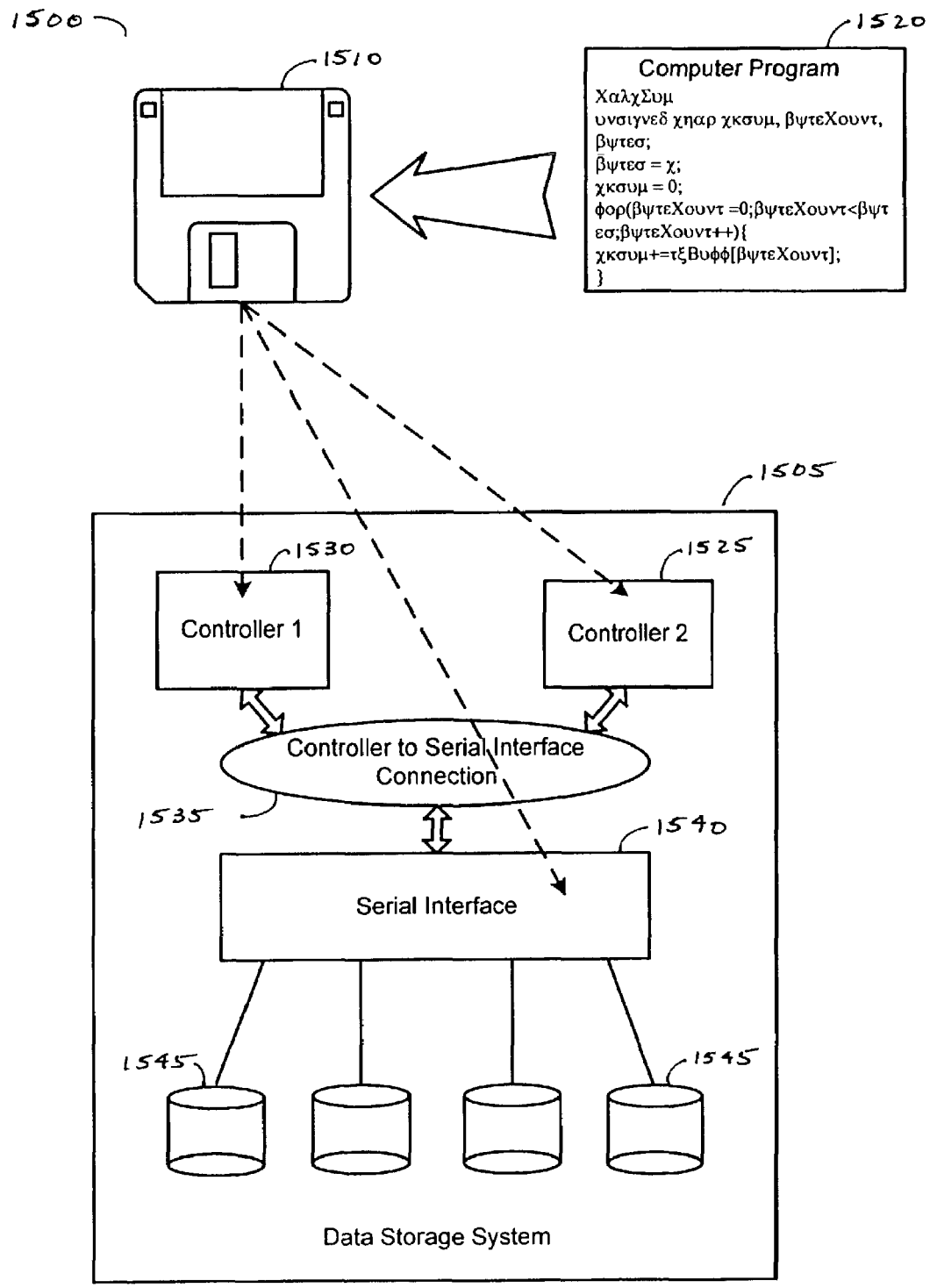
FIG. 15 illustrates a data storage system according to the present invention.

FIG. 15 illustrates a data storage system 1500 according to the present invention, wherein the processes illustrated with reference to FIGS. 4–14 may be tangibly embodied in a computer-readable medium or carrier, e.g. one or more of the fixed and/or removable data storage devices 1510 illustrated in FIG. 15, or other data storage or data communications devices. One or more computer programs 1520 expressing the processes embodied on the removable data storage devices 1510 may be loaded into various memory elements located within the data storage system components 1525, 1530, 1540 to configure the data storage system 1505 for operation in accordance with the invention. The computer programs 1520 comprise instructions which, when read and executed by the data storage system components 1525, 1530, 1540 of FIG. 15, cause the data storage system 1505 to perform the steps necessary to execute the steps or elements of the present invention.

The foregoing description of the exemplary embodiments of the invention has been presented for the purposes of illustration and description. It is not intended to be exhaustive or to limit the invention to the precise form disclosed. Although the present invention has been illustrated with a serial ATA interface used in conjunction with a hard disk array, various mass storage technologies are known in the art. Additionally, various interfaces, using serial or parallel configurations, are known in the art, and the invention is not limited to serial ATA. The principles of the invention may be used to implement data storage arrays of various mass storage devices using various interface technologies. Many modifications and variations are possible in light of the above teaching. It is intended that the scope of the invention be limited not with this detailed description, but rather by the claims appended hereto.

What is claimed is:

1. A method of data storage, comprising:
coupling a plurality of Serial Advanced Technology Attachment (S-ATA) data storage devices with a plurality of device controllers via a plurality of multi-controller switching interfaces, wherein each of the multi-controller switching interfaces serially couples to S-ATA data storage devices via serial connections, each of the multi-controller switching interfaces having a plurality of connection points configured to couple with a plurality of S-ATA data storage devices; and
transferring data between the plurality of S-ATA data storage devices and the device controllers coupled to the plurality of multi-controller switching interfaces via the plurality of connection points;
wherein coupling the plurality of device controllers to the plurality of multi-controller switching interfaces further comprises:
coupling a plurality of inputs of a multiplexer to serial outputs of the plurality of device controllers;
serially coupling the multi-controller switching interfaces in a one-to-one ratio to each of the plurality of S-ATA data storage devices; and
switching the plurality of inputs of the multiplexer to allow each of the plurality of device controllers to gain access to each S-ATA data storage device in the array.

2. The method of claim 1 further comprising configuring the plurality of S-ATA data storage devices as a redundant array of individual disks (RAID) array.

3. The method of claim 1, wherein the number of the plurality of device controllers is two device controllers arranged in an active-active configuration.

4. The method of claim 1 further comprising providing a communication link between the plurality of device controllers, wherein data may be transferred between the plurality of device controllers.

5. The method of claim 1, wherein coupling the plurality of device controllers to the plurality of S-ATA data storage devices further comprises:
coupling the plurality of device controllers and plurality of multi-controller switching interface to a bus;
coupling each S-ATA data storage device to one of the plurality of multi-controller switching interfaces by a serial connection; and
arbitrating access to the bus for data transfer between components coupled to the bus though a bus protocol.

6. The method of claim 5 further comprising configuring the bus as a peripheral component interface (PCI) bus.

7. The method of claim 5, wherein the number of the plurality of multi-controller switching interfaces is two and each interface is coupled to a portion of the S-ATA data storage devices.

8. The method of claim 5 further comprising using a plurality of reserve/release registers to indicate the accessibility of the S-ATA data storage devices.

9. The method of claim 5 further comprising configuring the plurality of multi-controller switching interfaces as components of an active midplane.

10. A system for data storage, comprising:
a plurality of S-ATA data storage devices;
a plurality of device controllers; and
a plurality of multi-controller switching interfaces, wherein each of the plurality of multi-controller switching interfaces serially couples to S-ATA data storage devices via a serial connection, each of the plurality of multi-controller switching interfaces having a plurality of connection points configured to connect to the plurality of device controllers for transferring data between the S-ATA data storage devices serially connected to the plurality of multi-controller switching interfaces and the plurality of device controllers;
wherein the plurality of device controllers and the plurality of multi-controller switching interfaces is coupled by a bus, wherein the plurality of multi-controller switching interfaces further comprises a plurality of bridges for coupling the bus to the plurality of multi-controller switching interfaces, a plurality of processors coupled to the plurality of bridges for arbitration and control functions of the one or more multi-controller switching interfaces and a plurality of physical layer interfaces for coupling the plurality of multi-controller switching interfaces to the plurality of S-ATA data storage devices, and wherein each physical layer interface further comprises a control unit for controlling communication signals through the physical layer interface, a transmitter coupled to one S-ATA data storage device for transmitting data to the plurality of S-ATA data storage devices and a receiver coupled to the one S-ATA data storage device for receiving data from the one S-AlA data storage device.

11. The system of claim 10, wherein each of the plurality of S-ATA data storage devices is part of an array of parallel ATA data storage devices coupled to serializer/deserializer circuitry.

12. The system of claim 10, wherein each of the plurality of S-ATA data storage devices is part of a redundant array of individual disks (RAID) array.

13. The system of claim 10, wherein the plurality of multi-controller switching interfaces further comprises a plurality of multiplexers, wherein the plurality of multiplexers communicatively couple the plurality of S-ATA data storage devices to the plurality of device controllers.

14. The system of claim 13, wherein the plurality of multiplexers is located on a midplane.

15. The system of claim 13, wherein the plurality of multiplexers are a component of a plurality of S-ATA data storage device carriers, each of the plurality of S-ATA data storage device carriers including S-ATA data storage devices.

16. The system of claim 15, wherein the plurality of S-ATA data storage devices carriers are field replaceable units.

17. The system of claim 10, wherein the plurality of device controllers are arranged in an active-active configuration.

18. The system of claim 10, wherein each of the plurality of device controllers is coupled to a network by a Fibre Channel (FC) link.

19. The system of claim 10, wherein each of the plurality of device controllers is coupled to a network by an Infini-Band (IB) link.

20. The system of claim 10, wherein each of the plurality of device controllers is coupled to a network by a small computer system interface (SCSI) link.

21. The system of claim 10, wherein each of the plurality of device controllers further comprises a controller-to-controller communication/arbitration processor to control communication between a plurality of device controllers.

22. The system of claim 10 wherein the plurality of device controllers and the plurality of multi-controller switching interfaces is coupled by a peripheral component interface (PCI) bus.

23. The system of claim 10 further comprising bus control circuitry for arbitrating communication between the plurality of device controllers and the plurality of multi-controller switching interfaces.

24. The system of claim 10, wherein the plurality of multi-controller switching interfaces further comprises a plurality of reserve/release registers to indicate accessibility of the S-ATA data storage devices.

25. The system of claim 10, wherein each of the plurality of device controllers is a field replaceable unit.

26. The system of claim 10, wherein the plurality of multi-controller switching interfaces is located on a midplane.

27. The system of claim 10, wherein the plurality of multi-controller switching interfaces are field replaceable units.

* * * * *

UNITED STATES PATENT AND TRADEMARK OFFICE
CERTIFICATE OF CORRECTION

PATENT NO. : 7,073,022 B2  Page 1 of 1
APPLICATION NO. : 10/155315
DATED : July 4, 2006
INVENTOR(S) : El-Batal et al.

It is certified that error appears in the above-identified patent and that said Letters Patent is hereby corrected as shown below:

Col. 12, Line 35: "S-A1A" should read -- S-ATA --
Col. 13, Line 8: "claim 10" should read -- claim 10, --
Col. 13, Line 12: "claim 10" should read -- claim 10, --

Signed and Sealed this

Twelfth Day of September, 2006

JON W. DUDAS
*Director of the United States Patent and Trademark Office*